United States Patent [19]

Huseby et al.

[11] Patent Number: 4,533,645

[45] Date of Patent: * Aug. 6, 1985

[54] HIGH THERMAL CONDUCTIVITY ALUMINUM NITRIDE CERAMIC BODY

[75] Inventors: Irvin C. Huseby, Schenectady; Carl F. Bobik, Burnt Hills, both of N.Y.

[73] Assignee: General Electric Company, Schenectady, N.Y.

[ * ] Notice: The portion of the term of this patent subsequent to Oct. 23, 2001 has been disclaimed.

[21] Appl. No.: 629,666

[22] Filed: Jul. 11, 1984

Related U.S. Application Data

[62] Division of Ser. No. 519,158, Aug. 1, 1983, Pat. No. 4,478,785.

[51] Int. Cl.$^3$ ............................................. C04B 35/58
[52] U.S. Cl. ........................................ 501/96; 264/65; 423/412; 501/98
[58] Field of Search ...................... 423/412, 409, 385; 501/96, 98

[56] References Cited

U.S. PATENT DOCUMENTS

| | | | |
|---|---|---|---|
| 3,108,887 | 10/1963 | Lenie et al. | 501/98 |
| 3,261,667 | 7/1966 | O'Connor | 423/412 |
| 4,152,182 | 5/1979 | Rutz | 423/412 |
| 4,203,733 | 5/1980 | Tanaka et al. | 501/98 |
| 4,435,513 | 3/1984 | Komeya et al. | 501/96 |
| 4,478,785 | 10/1984 | Huseby et al. | 264/65 |

FOREIGN PATENT DOCUMENTS 58-32072 2/1983 Japan ................................. 501/96
58-32073 2/1983 Japan ................................. 501/96

OTHER PUBLICATIONS

Chem. Abstracts, 99: 26974q and 26975r, Jul. 25, 1983.
Circular, Gem-680, Aluminum Nitride, 2 pages, Jun. 1981.

*Primary Examiner*—Helen M. McCarthy
*Attorney, Agent, or Firm*—Jane M. Binkowski; James C. Davis, Jr.; James Magee, Jr.

[57] ABSTRACT

The process comprises forming a mixture comprised of aluminum nitride powder and free carbon wherein the aluminum nitride has a predetermined oxygen content higher than about 0.8% by weight and wherein the amount of free carbon reacts with such oxygen content to produce a deoxidized powder or compact having an oxygen content ranging from greater than about 0.35% by weight to about 1.1% by weight and which is at least 20% by weight lower than the predetermined oxygen content, heating the mixture or a compact thereof to react the carbon and oxygen producing the deoxidized aluminum nitride, and sintering a compact of the deoxidized aluminum nitride producing a ceramic body having a density greater than 85% of theoretical and a thermal conductivity greater than 0.5 W/cm·K. at 22° C.

16 Claims, 1 Drawing Figure

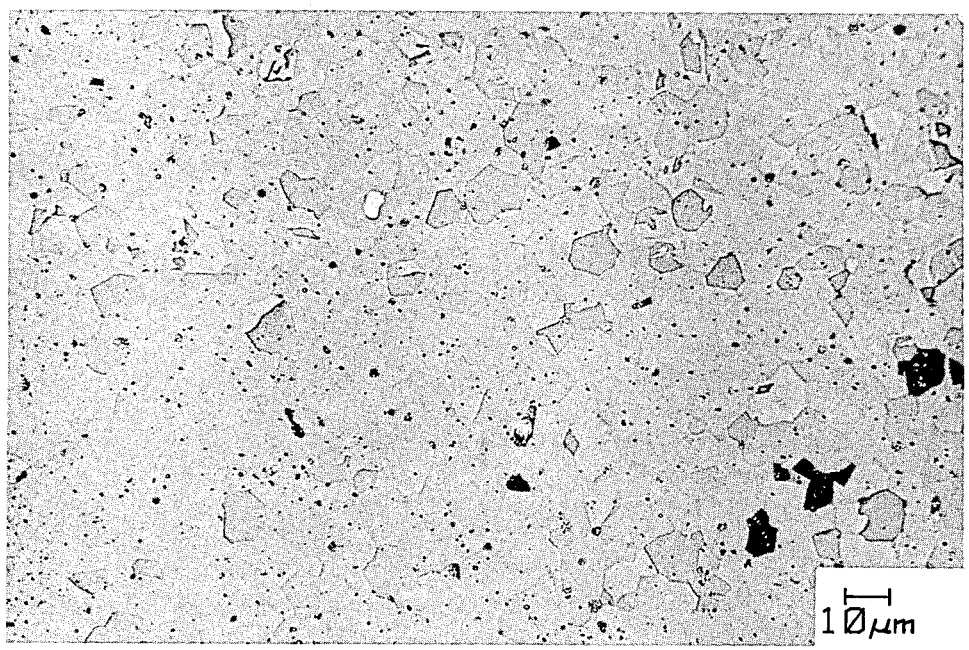

HIGH THERMAL CONDUCTIVITY ALUMINUM NITRIDE CERAMIC BODY

This application is a division of application Ser. No. 519,158, filed Aug. 1, 1983, now Pat. No. 4,478,785.

The present invention relates to the production of a phase-pure polycrystalline aluminum nitride body having a thermal conductivity higher than 0.5 W/cm·K at 22° C.

A suitably pure aluminum nitride single crystal, containing 300 ppm dissolved oxygen, has been measured to have a room temperature thermal conductivity of 2.8 W/cm·K, which is almost as high as that of BeO single crystal, which is 3.7 W/cm·K, and much higher than that of α-Al₂O₃ single crystal, which is 0.44 W/cm·K. The thermal conductivity of an aluminum nitride single crystal is a strong function of dissolved oxygen and decreases with an increase in dissolved oxygen content. For example, the thermal conductivity of aluminum nitride single crystal having 0.8 wt% dissolved oxygen, is about 0.8 W/cm·K.

Aluminum nitride has a strong affinity for oxygen. The introduction of oxygen into the aluminum nitride lattice in aluminum nitride powder results in the formation of Al vacancies via the equation:

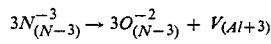

$$3N_{(N-3)}^{-3} \rightarrow 3O_{(N-3)}^{-2} + V_{(Al+3)}$$

Thus, the insertion of 3 oxygen atoms on 3 nitrogen sites will form one vacancy on an aluminum site. The presence of oxygen atoms on nitrogen sites will probably have a negligible influence on the thermal conductivity of AlN. However, due to the large difference in mass between an aluminum atom and a vacancy, the presence of vacancies on aluminum sites has a strong influence on the thermal conductivity of AlN and, for all practical purposes, is probably responsible for all of the decrease in the thermal conductivity of AlN.

There are usually three different sources of oxygen in AlN powder. Source #1 is discrete particles of Al₂O₃. Source #2 is an oxide coating, perhaps as Al₂O₃, coating the AlN powder particles. Source #3 is oxygen in solution in the AlN lattice. The amount of oxygen present in the AlN lattice in AlN powder will depend on the method of preparing the AlN powder. Additional oxygen can be introduced into the AlN lattice by heating the AlN powder at elevated temperatures. Measurements indicate that at ~1900° C. the AlN lattice can dissolve ~1.2 wt% oxgen.

The oxygen present with AlN powder as sources #1 and #2, and perhaps some of source #3, can be removed according to the present invention by utilizing free carbon.

Briefly, the present invention is directed to the deoxidation of aluminum nitride powder by means of free carbon producing a deoxidized powder with an oxygen content ranging from greater than 0.35% by weight to about 1.1% by weight, and pressureless sintering of a compact of the resulting deoxidized powder to produce a pressureless sintered polycrystalline aluminum nitride body having a density greater than 85% of theoretical density, an oxygen content ranging from greater than 0.35% by weight up to about 1.1% by weight of the sintered body and a thermal conductivity higher than 0.5 W/cm·K at 22° C.

In the present invention, oxygen content is determinable by neutron activation analysis.

By pressureless sintering herein it is meant the densification or consolidation of a compact or shaped body of the present deoxidized aluminum nitride at ambient pressure, i.e. without the application of mechanical pressure, into a ceramic body having a density greater than 85% of theoretical.

In the present invention, the thermal conductivity given for the present sintered body is at about 22° C.

Those skilled in the art will gain a further and better understanding of the present invention from the detailed description set forth below, considered in conjunction with the accompanying figure which is a photomicrograph (magnified 750×) of a sectioned and polished surface of the present sintered body having a density of 97.2% of the theoretical density of aluminum nitride.

Briefly stated, in one embodiment wherein the loose powder is deoxidized, the present process for producing a sintered body having a density greater than 85% of the theoretical density for aluminum nitride and a thermal conductivity greater than 0.5 W/cm·K comprises providing at least a substantially uniform particulate mixture comprised of aluminum nitride having a predetermined oxygen content greater than 0.8% by weight, and preferably greater than 0.9% by weight, of said particulate aluminum nitride and a carbonaceous additive selected from the group consisting of free carbon and a carbonaceous organic material, said aluminum nitride having a specific surface area greater than about 4.7 m²/g, said carbonaceous organic material pyrolyzing at a temperature ranging from about 50° C. to 1000° C. to free carbon and gaseous product of decomposition which vaporizes away, said free carbon having a specific surface area greater than about 40 m²/g, said free carbon being in an amount which produces a deoxidized powder having an oxygen content ranging from greater than about 0.35% by weight to about 1.1% by weight of said deoxidized powder and which is at least about 20% by weight lower than said predetermined oxygen content, deoxidizing said particulate mixture by heating said mixture in a nonoxidizing atmosphere selected from the group consisting of argon, nitrogen and mixtures thereof to a temperature ranging from about 1350° C. to about 1750° C. pyrolyzing any organic material therein to produce free carbon and reacting the free carbon therein with the oxygen content of said aluminum nitride producing said deoxidized powder and gaseous product which vaporizes away, shaping the deoxidized powder into a compact and sintering the compact at ambient pressure in a nonoxidizing atmosphere selected from the group consisting of argon, nitrogen and mixtures thereof at a temperature ranging from about 1900° C. to about 2200° C. producing said sintered body, said compact retaining its oxygen content in an amount greater than about 0.35% by weight of said compact during said sintering, said oxygen content being determinable by neutron activation analysis.

Briefly stated, in another embodiment wherein the compact is deoxidized, the present process for producing a sintered body having a density greater than 85% of the theoretical density for aluminum nitride and a thermal conductivity greater than 0.5 W/cm·K comprises providing at least a substantially uniform particulate mixture comprised of aluminum nitride having a predetermined oxygen content greater than 0.8% by weight, and preferably greater than 0.9% by weight, of said particulate aluminum nitride and a carbonaceous additive selected from the group consisting of free carbon and a carbonaceous organic material, said aluminum nitride having a specific surface area greater than about 4.7 m²/g, said carbonaceous organic material pyrolyzing at a temperature ranging from about 50° C. to 1000° C. to free carbon and gaseous product of decomposition which vaporizes away, said free carbon having a specific surface area greater than about 40 m²/g, shaping said mixture into a compact, said free carbon being in an amount which produces a deoxidized compact having an oxygen content ranging from greater than about 0.35% by weight to about 1.1% by weight of said deoxidized compact and which is at least about 20% by weight lower than said predetermined oxygen content, deoxidizing said compact by heating said compact in a nonoxidizing atmosphere selected from the group consisting of argon, nitrogen and mixtures thereof to a temperature ranging from about 1350° C. up to a temperature at which the pores of the compact remain open pyrolyzing any organic material therein to produce free carbon and reacting the free carbon therein with the oxygen content of said aluminum nitride producing said deoxidized compact and gaseous product which vaporizes away, and sintering said deoxidized compact at ambient pressure in a nonoxidizing atmosphere selected from the group consisting of argon, nitrogen and mixtures thereof at a temperature ranging from about 1900° C. to about 2200° C. producing said sintered body, said compact retaining its oxygen content during said sintering in an amount greater than about 0.35% by weight of said compact, said oxygen content being determinable by neutron activation analysis.

In the present process, the aluminum nitride powder can be of commercial or technical grade. Specifically, it should not contain any impurities which would have a significantly deleterious effect on the desired properties of the resulting sintered product, and preferably, the aluminum nitride is at least about 99% pure excluding oxygen. Typically, commercially available aluminum nitride contains from about 1.5% by weight to about 3% by weight of oxygen.

The oxygen content of aluminum nitride is determinable by neutron activation analysis.

The present aluminum nitride powder has a specific surface area greater than about 4.7 m²/g and preferably from about 5.0 m²/g to about 12 m²/g according to BET surface area measurement. As defined through its specific surface area, it has an average equivalent spherical particle size less than about 0.39 micron and preferably from about 0.37 micron to about 0.15 micron. Aluminum nitride powder having a specific surface area of about 4.7 m²/g or less is difficult to sinter in the present invention and as a practical matter is not useful.

The present free carbon generally has a specific surface area greater than 40 m²/g and preferably greater than 150 m²/g according to BET surface area measurement. In terms of particle size, the present free carbon has an equivalent average spherical particle size of less than 0.09 micron and preferably less than 0.024 micron. The free carbon most preferably is as fine as possible to insure good intimate contact with the AlN powder to produce the present deoxidized AlN.

Free carbon in the form of a powder can be admixed with the aluminum nitride powder by a number of conventional techniques such as, for example, ball milling in a liquid dispersion. Preferably, the particulate carbon is graphite.

The carbonaceous organic material can be admixed with the aluminum nitride powder by a number of conventional techniques and heat-decomposed, i.e., pyrolyzed, in the aluminum nitride powder or compact to produce elemental carbon and gaseous product of decomposition which vaporize away. The pyrolysis of the organic material is carried out at a temperature ranging from about 50° C. to about 1000° C. at ambient pressure and should be carried out in a nonoxidizing atmosphere which has no significant deleterious effect thereon such as, for example, argon or nitrogen, and most preferably, it is nitrogen. The actual amount of free carbon introduced by pyrolysis of the organic material can be determined by pyrolyzing the organic material alone and determining weight loss. Preferably, pyrolysis of the organic material in the AlN compact is done in the sintering furnace as the temperature is being raised to deoxidizing temperature, i.e. the temperature at which the resulting free carbon reacts with the oxygen content of the AlN.

Specifically, if the organic material is a solid, it is preferably admixed in the form of a solution to coat the aluminum nitride particles. The wet mixture can then be treated to remove the solvent, and the resulting dry mixture heated to decompose the organic material producing free carbon before the mixture is formed into a compact. If desired, the wet mixture can be formed into a compact and the solvent removed therefrom. The solvent can be removed by a number of techniques such as by evaporation or by freeze drying, i.e. subliming off the solvent in vacuum from the frozen dispersion. Likewise, if the organic material is a liquid, it can be admixed with the aluminum nitride powder and the wet particulate mixture heated to pyrolyze the organic material and form free carbon, or the wet mixture can be formed into a compact which is then heated to pyrolyze the organic material to form free carbon in situ and diffuse away gaseous product of decomposition. In these ways, a substantially uniform coating of the organic material on the aluminum nitride powder is obtained which on pyrolysis produces a substantially uniform distribution of free carbon.

High molecular weight aromatic compounds or materials are the preferred carbonaceous organic materials for making the present free carbon addition since they ordinarily give on pyrolysis the required yield of particulate free carbon of submicron size. Examples of such aromatic materials are a phenolformaldehyde condensate resin known as novolak which is soluble in acetone or higher alcohols, such as butyl alcohol, as well as many of the related condensation polymers or resins such as those of resorcinol-formaldehyde, aniline-formaldehyde, and cresol-formaldehyde. Another satisfactory group of materials are derivatives of polynuclear aromatic hydrocarbons contained in coal tar, such as dibenzanthracene and chrysene. A preferred group are polymers of aromatic hydrocarbons such as polyphenylene or polymethylphenylene which are soluble in aromatic hydrocarbons.

In the present deoxidation, most of the free carbon reacts with the oxygen content of the aluminum nitride producing carbon monoxide gas which vaporizes away. It is believed that the following deoxidation reactions occur wherein the oxygen content of the aluminum nitride is given as $Al_2O_3$:

$$Al_2O_3 + 3C \rightarrow 2Al_{(l)} + 3CO_{(g)} \quad (1)$$

$$Al_2O_3 + 2C \rightarrow 2CO_{(g)} + Al_2O_{(g)} \quad (2)$$

In all of the deoxidation reactions, gaseous carbon-containing product is produced which vaporizes away thereby removing free carbon.

Also, a minor amount of free carbon, i.e. ordinarily less than about 0.1% by weight, may dissolve in the aluminum nitride. In addition, a minor amount of free carbon may undergo the following reaction:

$$C + AlN \rightarrow AlCN_{(g)} \quad (3)$$

In the present deoxidation, the amount of free carbon should produce the present deoxidized powder or compact. Specifically, the amount of free carbon used should produce a deoxidized powder or compact having an oxygen content ranging from greater than about 0.35% by weight to about 1.1% by weight of the deoxidized powder or compact and such oxygen content should be at least about 20% by weight lower than the predetermined amount of oxygen content of the starting aluminum nitride. An oxygen content of about 0.35% by weight or lower will not produce a sufficiently dense product, i.e. it will not produce the present sintered body having a density greater than 85% of the theoretical density for aluminum nitride. For a given system, with increasing oxygen content, sintered bodies with increasing density but decreasing thermal conductivity will be produced. Preferably, the amount of free carbon used should produce a deoxidized powder wherein the oxygen content ranges from greater than 0.8% by weight to about 1.1% by weight of the deoxidized powder. Also, preferably, the amount of free carbon used should produce a deoxidized compact wherein the oxygen content ranges from about greater than 0.5% by weight up to about 0.9% by weight and most preferably from about 0.65% by weight up to about 0.9% by weight, of the deoxidized compact. Any free carbon which remains in the deoxidized powder or compact should be insufficient to deoxidize the compact to the extent which would prevent its densification to the present density, and specifically, such free carbon would be less than about 0.2% by weight of the deoxidized compact. More specifically, the deoxidized compact should maintain its oxygen content greater than 0.35% by weight during sintering.

The specific amount of free carbon required to produce the present deoxidized powder or compact can be determinable empirically. For example, a series of deoxidations of a given aluminum nitride of predetermined oxygen content can be carried out in accordance with the present invention where, with each deoxidation, the amount of free carbon is incrementally increased and the oxygen content of each resulting deoxidized powder or compact is determined by neutron activation analysis.

Preferably, however, an initial approximate amount is calculated from equation (1), that is the stoichiometric amount for carbon set forth in equation (1) and using such approximate amount, the amount of carbon required to produce the present deoxidized powder or compact would require one or a few deoxidations of a given aluminum nitride.

The present deoxidation procedure comprises heating a mixture of aluminum nitride and free carbon at deoxidation temperature to react the free carbon with the oxygen content of the aluminum nitride to produce the present deoxidized powder or compact. Deoxidation is carried out at ambient pressure in a nonoxidizing atmosphere selected from the group consisting of argon, nitrogen and mixtures thereof, and most preferably, it is nitrogen. Generally, deoxidation time ranges from about ¼ hour to about 2 hours depending largely on temperature, particle size and uniformity of the mixture of aluminum nitride and carbon, i.e. the higher the deoxidation temperature, the smaller the particle size and the more uniform the mixture, the shorter is deoxidation time.

In one embodiment, the powder comprised of a mixture of aluminum nitride and free carbon is deoxidized by heating it at a temperature ranging from about 1350° C. to about 1750° C., and preferably about 1600° C., to effect reaction between the carbon and oxygen content of the aluminum nitride. Temperatures lower than 1350° C. are not useful since they take too long to be practical, whereas temperatures higher than about 1750° C. will aggregate the powder.

In another embodiment, a compact comprised of aluminum nitride and free carbon is heated at a temperature ranging from 1350° C. up to a temperature at which the pores of the compact remain open, generally up to about 1800° C., and preferably at about 1600° C., to produce the present deoxidized compact. Preferably, the compact is deoxidized in the sintering furnace by holding the compact at deoxidation temperature for the required time and then raising the temperature to sintering temperature. The deoxidation of the compact must be completed before sintering closes off pores in the compact preventing gaseous product from vaporizing away and thereby preventing production of the present sintered body.

A number of techniques can be used to shape the particulate mixture into a compact. For example, it can be extruded, injection molded, die-pressed, isostatically pressed or slip cast to produce the compact of desired shape. Any lubricants, binders or similar materials used to aid shaping of the mixture should have no significant deteriorating effect on the compact or the present resulting sintered body. Such shaping-aid materials are preferably of the type which evaporate on heating at relatively low temperatures, preferably below 200° C., leaving no significant residue. The compact, should have a density of at least about 40% of the theoretical density for aluminum nitride and preferably greater than 50% to promote densification during sintering.

There is some additional loss of oxygen on heating the deoxidized compact to sintering temperature and during sintering which varies and depends largely on the rate of heating, on sintering temperature and also rate of densification of the particular compact. For example, the higher the open porosity of the compact above 1600° C. and the slower the heating rate to sintering temperature, the larger is the amount of oxygen loss that occurs. In the present invention, the deoxidized compact should retain its oxygen content in an amount greater than about 0.35% by weight of the compact and preferably greater than about 0.4% by weight during sintering to produce the present product.

The deoxidized compact is sintered at a temperature ranging from about 1900° C. to about 2200° C., and preferably about 2050° C. Temperatures lower than about 1900° C. would not produce the present ceramic body having a density greater than 85% of theoretical. On the other hand, temperatures higher than about 2200° C. are likely to decompose the aluminum nitride. The particular required sintering temperature for producing the present product is determinable empirically and depends largely on the surface area of the aluminum nitride, density of the compact and oxygen content of the aluminum nitride. Specifically, the higher the surface area of the aluminum nitride, i.e. the smaller the size of the particles, the lower is the required sintering temperature. Also, the higher the density of the compact, the lower is the required sintering temperature. On the other hand, the higher the $O_2$ content, the lower is the required sintering temperature. Sintering time is determinable empirically. Typically, sintering time at a temperature of about 2050° C. is about one hour.

The deoxidized compact is sintered at ambient pressure in an atmosphere selected from the group consisting of argon, nitrogen and mixtures thereof.

Preferably, the compact, before or after it is deoxidized, is packed in aluminum nitride powder before sintering to retard weight loss due to decomposition of the aluminum nitride during sintering at about 1950° C. and higher.

The present sintered polycrystalline body is a pressureless sintered ceramic body. It is comprised of aluminum nitride and contains oxygen ranging from greater than about 0.35% by weight up to about 1.1% by weight of the body. Preferably, the present sintered body contains oxygen ranging from greater than about 0.4% by weight up to about 0.9% by weight and most preferably from about 0.55% by weight to about 0.8% by weight of the body since at higher oxygen contents higher densities are attainable. The present sintered body contains carbon in some form ranging from a detectable amount to less than about 0.2% by weight of the body.

The present pressureless sintered body is phase pure or contains no significant amount of second phase. By no significant amount of second phase it is meant herein that the total amount of second phase in the present sintered body is less than about 1% by volume of the body.

The present ceramic body has a density greater than 85% of the theoretical density for aluminum nitride. Generally, it has a density greater than 90%, and preferably greater than 95% of the theoretical density for aluminum nitride.

The present invention makes it possible to fabricate complex and/or hollow shaped polycrystalline aluminum nitride ceramic articles directly. Specifically, the present sintered product can be produced in the form of a useful complex shaped article without machining such as an impervious crucible, a thin walled tube, a long rod, a spherical body, or a hollow shaped article. The dimensions of the present sintered product differ from those of the unsintered body, by the extent of shrinkage, i.e. densification, which occurs during sintering.

The present ceramic body has a number of uses. It is especially useful as a substrate for an integrated circuit, particularly as a substrate for a semiconducting Si chip for use in computers. The present ceramic body also is useful as a sheath for temperature sensors and as a component in contact with liquid aluminum at high temperatures.

Because the present product is of single phase composition, or contains no significant amount of second phase, it is less chemically reactive toward some materials.

In the present invention, unless otherwise stated, the density of the sintered body as well as that of the green body is given as a fractional density of the theoretical density of aluminum nitride (3.261 g/cm$^3$).

The invention is further illustrated by the following examples wherein the procedure was as follows, unless otherwise stated:

A standard commercial aluminum nitride powder was used which was 99.8% pure exclusive of oxygen. It had an oxygen content of 1.97% by weight of the powder and a surface area of 5.25 m$^2$/g. The analysis given by the vendor was as follows:

| SPECIFIC ANALYSIS OR PROPERTY | | | |
|---|---|---|---|
| N = 33% | | | |
| C = 150 ppm | | | |
| SPECTROGRAPHIC ANALYSIS | | | |
| Cu | 0.0005–0.005% | Mn | 0.001% |
| Fe | 0.001–0.01 | Mg | 0.0005–0.005 |
| Si | 0.0005–0.005 | | |

The aluminum nitride powder, prior to use, was stored in a glass flask in a $N_2$ filled glove box.

The graphite used had a specific surface area of 200 m$^2$/g or a mean particle size of 0.018$\mu$. The graphite powder was preheated in nitrogen at 900° C. for one hour to sublime off the volatiles therein such as moisture.

$O_2$ content was determined by neutron activation analysis.

Phase composition of the sintered body was determined by optical microscopy and X-ray diffraction analysis.

The pressed green samples, i.e. compacts, were about 0.4" in diameter and 0.2" to 0.3" long.

The compacts were heated in the furnace at the rate of about 120° C. per minute.

The thermal conductivity of the sintered body was measured by a steady state heat-flow method using a rod-shaped sample sectioned from the sintered body. This method was originally devised by A. Berget in 1888 and is described in an article by G. A. Slack in the "Encyclopeadic Dictionary of Physics", Ed. by J. Thewlis, Pergamon, Oxford, 1961. In this technique the sample is placed inside a high-vacuum chamber, heat is supplied at one end by an electrical heater, and the temperatures are measured with fine-wire thermocouples. The sample is surrounded by a guard cylinder with a matched temperature gradient. The absolute accuracy is ±5%. As a comparison, the thermal conductivity of an $Al_2O_3$ single crystal was measured with this apparatus to be 0.44 W/cm·K at about 22° C.

EXAMPLE 1

0.115 grams of graphite were added to 10 grams of aluminum nitride powder and the mixture was vibratory milled 24 hours with aluminum nitride milling media and heptane in a plastic jar at room temperature. The resulting dispersion was poured into a flask and dried at 50°–200° C. under a vacuum of roughly 200 torr. After vacuum drying, the flask was back-filled with $N_2$. Thus, during drying the sample was not exposed to oxygen. During milling some of the aluminum nitride grinding media wore off which was determined to be 0.413 grams, so that the resulting dried powder mixture contained graphite in an amount of 1.09% by weight of the mixture.

The flask containing the dried mixture was placed into a N$_2$ filled glove box where a portion of it was placed in a die, removed from the glove box and die pressed at room temperature under a pressure of 10 Kpsi. The die was then placed into the N$_2$ filled glove box where the resulting pellet, i.e. compact, which was black, was removed and inserted in a molybdenum boat where it was buried in a mixture of the same composition as the pellet, i.e. aluminum nitride powder and 1.09 wt % carbon. The boat was covered with a molybdenum lid and transferred in a N$_2$ filled flask to a molybdenum lined furnace where it was heated in an atmosphere of nitrogen at ambient pressure to 1550° C. It was held at 1550° C. for 60 minutes and then raised to 1600° C. where it was held for 30 minutes. The temperature was then raised to a sintering temperature of 2060° C. where it was held for 70 minutes and then furnace-cooled in the nitrogen atmosphere to room temperature.

The resulting sintered body was grey and showed a weight loss of 4.45% which indicated that most of the graphite had reacted and had been removed as a carbon-containing gaseous product. It had a density of 90.6% of the theoretical density for aluminum nitride. The sintered body was phase pure and it had an oxygen content of 0.42% by weight of the body. Its electrical resistivity at room temperature, i.e. about 22° C., was determined at 100 v to be $4 \times 10^{14}$ ohm·cm, and at 1000 v it was $8 \times 10^{12}$ ohm·cm.

This example is illustrated in Table I.

TABLE I

| Example No. | Sample No. | Drying Atmosphere for Milled Dispersion | Graphite % by wt of AlN + Graphite | Pressing Pressure to produce compact (K psi) | Heat-Treating Condition | Heat Treatment Temp °C | Time Min | + | Temp °C | Time Min | Oxygen wt % | Carbon wt % | Wt Loss % | Relative Density % | Thermal Conductivity W/cm·@22°C | Second Phase | Electrical Resistivity (Ω·cm @ 22°C) 100v | 1000v |
|---|---|---|---|---|---|---|---|---|---|---|---|---|---|---|---|---|---|---|
| 1 | 63A | Vacuum | 1.09 | 10 | Buried in AlN powder | 1550 | 60 | + | 2060 | 70 | 0.42 | | 4.45 | 90.6 | 0.71 | None | 4 × 10$^{14}$ | 8 × 10$^{12}$ |
| 1A | 63E | " | 1.09 | 10 | " | 1600 | 30 | | | | | | ~6 | 89.8 | | | | |
| 1B | 63F | " | 1.09 | 10 | " | 1600 | 60 | | | | | | | 91.9 | | | | |
| 2 | 63B | " | 1.09 | 10 | " | 1660 | 60 | + | 2100 | 60 | 0.60 | 0.034 | 4.38 | 92.1 | | | 5 × 10$^{14}$ | 6 × 10$^{12}$ |
| 3 | 63C | " | 1.09 | 10 | " | 1660 | 60 | + | 2060 | 70 | | 0.083 | 2.86 | 58.9 | | | | |
| 4 | 62A | " | 1.42 | 10 | " | 1550 | 60 | | | | | 0.045 | 3.86 | 64.5 | | | | |
| 5 | 62B | " | 1.42 | 10 | " | 1600 | 30 | | | | | 0.105 | 4.57 | 61.2 | | | | |
| 6 | 62C | " | 1.42 | 10 | " | 1600 | 60 | + | 2050 | 60 | | 0.099 | 3.23 | 56.2 | | | | |
| 7 | 62D | " | 1.42 | 10 | " | 1600 | 60 | + | 2050 | 60 | 0.57 | | | | | | | |
| 8 | 62E | " | 1.42 | 10 | " | 1600 | 60 | + | 2050 | 60 | 0.18 | | | | | | | |
| 9 | 47B | " | 1.72 | 55 | " | 1750 | 30 | + | 2075 | 90 | | | | 67 | | | | |
| 10 | 47C | " | 1.72 | 5 | " | 1815 | 15 | | | | | | | | | | | |
| 11 | 60A | " | 2.06 | 10 | " | 1600 | 60 | + | 2050 | 60 | | 0.138 | 3.15 | 52 | | None | | |
| 12 | 60B | " | 2.06 | 10 | " | 1600 | 60 | | | | | 0.056 | 3.53 | 59.7 | | | | |
| 13 | 60D | " | 2.06 | 10 | " | 1600 | 60 | | | | | 0.505 | 3.41 | 54.0 | | | | |
| 14 | 60E | " | 2.06 | 10 | " | 1600 | 60 | + | 2050 | 60 | 0.49 | | | | | | | |
| 15 | 44A | Air | 0.91 | 50 | Not Buried | 1500 | 60 | | | | 0.17 | | 2.84 | 63.8 | | | | |
| 16 | 44B | Air | 0.91 | 50 | " | 1500 | 60 | | | | | | 2.78 | 64.0 | | | | |
| 17 | 44C | Air | 0.91 | 50 | " | 1400 | 60 | | | | | | 2.16 | 62.1 | | | | |
| 18 | 45A | Air | 1.41 | 50 | " | 1600 | 60 | | | | | 0.089 | 4.72 | 65.8 | | None | | |
| 19 | 45B | Air | 1.41 | 50 | " | 1600 | 60 | | | | | | 7.54 | 85.6 | | None | | |
| 20 | 45C | Air | 1.41 | 50 | Buried in AlN powder | 1600 | 60 | + + | 1975 2050 | 60 90 | 0.78 | | 12.3 | 91.6 | 0.82 | None | 4 × 10$^{14}$ | 5 × 10$^{12}$ |
| 21 | 45D | Air | 1.41 | 50 | Not Buried | 1600 | 60 | + | 2050 | 90 | 0.55 | | 4.8 | 97.2 | 0.82 | None | 3 × 10$^{13}$ | 8 × 10$^{12}$ |
| 22 | 40 | Air | 0 | 50 | Buried in AlN powder | 1600 | 60 | + | 1975 | 60 | 1.88 | | 2.90 | 95.2 | 0.41 | Al$_{10}$N$_8$O$_3$ | | |
| 23 | 55B | Vacuum | 1.90 | 10 | Buried in AlN powder | | | | 2050 | 60 | | | None | 76.2 | | | | |

All of the examples in Table I were carried out in substantially the same manner except as shown in the Table and except as noted herein.

Specifically, in Examples 1A, 1B and 2-14 and 23, the milled dispersion of aluminum nitride and graphite was dried in the same manner as in Example 1. However, in Examples 15-22, the milled dispersion was dried in air under a heating lamp for an hour, and by such drying in air, the powder picked up additional oxygen.

The graphite content given in Table I is the amount present in the milled dried particulate mixture.

In Examples 1A, 1B and 2-14 and 23, the dried particulate mixture was die pressed at room temperature under the given pressure. In Examples 9 and 15-22, the powder mixture was initially die pressed at room temperature at about 5 Kpsi and the resulting pellet was then isostatically pressed at room temperature at the pressure given in Table I.

In Examples 1A, 1B, 2-14, 21 and 23, the compact was buried in a powder mixture of aluminum nitride and carbon that had the same composition as the compact prior to being deoxidized, or prior to being deoxidized and sintered. In Examples 15-20 and 22, the compact was not buried in aluminum nitride powder or any other powder.

All of the heat treatment in Table I, i.e. deoxidation or deoxidation and sintering, was carried out in an atmosphere of nitrogen at ambient pressure except Example 1B. Specifically, in Example 15, the flow rate of nitrogen was approximately 2 cubic feet per hour and in the remaining examples (except Example 1B) it was approximately 0.1 cubic feet per hour. Except for Example 1B, all of the resulting heat-treated samples were furnace-cooled in the nitrogen atmosphere to about room temperature. In Example 1B the compact was deoxidized and sintered in argon at ambient pressure. The flow rate of argon was approximately 0.1 cubic feet per hour, and the resulting heat-treated sample was furnace-cooled in argon to about room temperature.

The heat treatment in Examples 1A, 1B, 5, 8, 9, 11, 14 and 19-21 was substantially the same as set forth in Example 1 except as shown in the Table and noted herein.

Examples 2 and 4 were carried out in substantially the same manner as Example 1 except as shown in the Table and except that deoxidation of the compact was carried out as it was heated to sintering temperature, which was at a rate of about 120° C. per minute. Example 22 was carried out in substantially the same manner as Example 2 except that it did not contain graphite and except as shown in Table I.

Examples 3, 6, 7, 10, 12, 13 and 15-18 were carried out in substantially the same manner as Example 1 except that the compact was not sintered and except as shown in the Table and noted herein.

In Examples 1, 1A, 1B and 2-21, the compact of aluminum nitride and graphite was deoxidized. However, in Example 23, the resulting milled dried particulate mixture, which as black, was heated in an $Al_2O_3$ tube furnace in nitrogen at ambient pressure to a temperature of 1550° C. where it was held for 60 minutes and then furnace-cooled in nitrogen to about room temperature. The resulting deoxidized aluminum nitride powder was grey and showed a weight loss of 3.17 weight % which indicated that a substantial amount of the graphite and reacted and had been removed as a carbon-containing gaseous product. The deoxidized powder had an oxygen content of 0.53% by weight.

Chemical analysis of a portion of the deoxidized powder showed that it contained 0.276% by weight carbon. In Example 23, a portion of the deoxidized powder was die pressed at room temperature producing a compact which was sintered at 2050° C. for 60 minutes. Density of the compact in Example 23 was inhibited by the additional deoxidation of the aluminum nitride by the remaining carbon resulting in too low an oxygen content.

Relative density in Table I is % of the theoretical density for aluminum nitride (3.261 g/cc).

Examples 1, 2, 4, 5, 8, 11, 14 and 20-22 show the oxygen and/or carbon content of the sintered body whereas the remaining examples show the oxygen and/or carbon content of the deoxidized compact. The oxygen content and carbon content is given as % by weight of the deoxidized compact or sintered body.

In Table I the given thermal conductivity and electrical resistivity is that of the sintered body. Thermal conductivity and electrical resistivity was determined at room temperature which was about 22° C.

In Table I, Examples 1, 1A, 1B, 2 and 19-21 illustrate the production of the present sintered body. Specifically, based on other work and a comparison of the thermal conductivity and oxygen content of Examples 1, 20 and 21 and the oxygen content of Example 2 indicate that the sintered bodies of Examples 1A, 1B and 2 should have a thermal conductivity of at least about 0.7 W/cm·K at about 22° C.

Also, a comparison of Example 19 with Examples 20 and 21 shows that the sintered body of Example 19 would have an oxygen content greater than 0.4% by weight but less than 0.9% by weight and that it would have thermal conductivity of at least about 0.55 W/cm·K. Also, a comparison of Example 19 with Examples 20 and 21 shows that the sintered body of Example 19 would have an electrical resistivity greater than $10^{11}$ at 100 volts at a temperature of 22° C.

A polished but not etched section of Example 21 is illustrated in the accompanying FIGURE. The large black spots in the FIGURE are pull-outs caused by polishing.

The FIGURE illustrates the substantially uniform microstructure of the present sintered body and shows that the grains are relatively equiaxed and uniform in size. Also, the figure shows that the microstructure is single phase and contains no significant amount of second phase.

The sintered bodies of Examples 1, 1A, 1B, 2 and 19-21 have a number of uses. They would be particularly useful as a substrate for an electronic circuit. Also, the denser bodies would be useful as crucibles for some metals and alloys, e.g. aluminum.

Example 3 of Table I illustrates deoxidation of the compact and the amount of carbon in the deoxidized compact of Example 1.

A comparison of Examples 4-8 shows that densification was inhibited by the significant loss of oxygen on heating at 2050° C. as shown by a comparison of the oxygen contents of Examples 7 and 8.

A comparison of Examples 9-14 shows that densification of the compact was inhibited by too large a carbon content for the amount of oxygen therein and that additional deoxidation took place above 1600° C. as illustrated by the oxygen contents of Examples 13 and 14.

Since the milled dispersion of Examples 4-8 was not exposed to oxygen during drying, the oxygen content of the resulting dried particulate mixture was significantly lower than that of Examples 18-21 which had been dried in air.

Examples 15-17 illustrate increasing weight loss with increasing deoxidation temperature.

Example 18 illustrates the carbon content of the deoxidized compact present in Examples 19-21.

In Example 22 no graphite was used and the sintered body had a low thermal conductivity and contained second phase in an amount of about 10% by volume of the body.

In Example 23 densification of the body was limited on sintering by additional deoxidation caused by the remaining carbon.

What is claimed is:

1. A polycrystalline aluminum nitride body having a density greater than 85% of the theoretical density for aluminum nitride and a thermal conductivity greater than 0.5 W/cm·K at 22° C., said body consisting essentially of aluminum nitride phase, said body containing oxygen in an amount ranging from greater than about 0.35% by weight up to about 1.1% by weight of said body as determined by neutron activation analysis, said body containing carbon in an amount ranging from a detectable amount to less than about 0.2% by weight of said body, said body being produced by the process which consists essentially of providing at least a substantially uniform particulate mixture comprised of aluminum nitride having a predetermined oxygen content greater than about 0.8% by weight of said particulate aluminum nitride and a carbonaceous additive selected from the group consisting of free carbon, carbonaceous organic material and mixtures thereof, said aluminum nitride having a specific surface area greater than about 4.7 m$^2$/g, said carbonaceous organic material pyrolyzing at a temperature ranging from about 50° C. to 1000° C. to free carbon and gaseous product of decomposition which vaporizes away, said free carbon having a specific surface area greater than about 40 m$^2$/g, deoxidizing said particulate mixture by heating said mixture in a nonoxidizing atmosphere selected from the group consisting of argon, nitrogen and mixtures thereof to a temperature ranging from about 1350° C. to about 1750° C. pyrolyzing any organic material therein to produce free carbon and reacting the free carbon therein with the oxygen content of said aluminum nitride producing deoxidized powder and gaseous product which vaporizes away, said free carbon being in an amount which produces a deoxidized powder having an oxygen content ranging from greater than about 0.35% by weight to about 1.1% by weight of said deoxidized powder and which is at least about 20% by weight lower than said predetermined oxygen content, shaping the deoxidized powder into a compact and sintering the compact at ambient pressure in a nonoxidizing atmosphere selected from the group consisting of argon, nitrogen and mixtures thereof at a temperature ranging from about 1900° C. to about 2200° C. producing said sintered body, said compact retaining its oxygen content in an amount greater than about 0.35% by weight of said compact during said sintering, said oxygen content being determinable by neutron activation analysis.

2. A polycrystalline aluminum nitride body having a density greater than 85% of the theoretical density for aluminum nitride and a thermal conductivity greater than 0.5 W/cm·K at 22° C., said body consisting essentially of aluminum nitride phase, said body containing oxygen ranging from greater than about 0.35% by weight up to about 1.1% by weight of said body as determined by neutron activation analysis, said body containing carbon in an amount ranging from a detectable amount to less than about 0.2% by weight of said body, said body being produced by the process which consists essentially of providing at least a substantially uniform particulate mixture comprised of aluminum nitride having a predetermined oxygen content greater than about 0.8% by weight of said particulate aluminum nitride and a carbonaceous additive selected from the group consisting of free carbon, a carbonaceous organic material and mixtures thereof, said aluminum nitride having a specific surface area greater than about 4.7 m$^2$/g, said carbonaceous organic material pyrolyzing at a temperature ranging from about 50° C. to 1000° C. to free carbon and gaseous product of decomposition which vaporizes away, said free carbon having a specific surface area greater than about 40 m$^2$/g, shaping said mixture into a compact, deoxidizing said compact by heating said compact in a nonoxidizing atmosphere selected from the group consisting of argon, nitrogen and mixtures thereof to a temperature ranging from about 1350° C. up to a temperature at which the pores of the compact remain open pyrolyzing any organic material therein to produce free carbon and reacting the free carbon therein with the oxygen content of said aluminum nitride producing said deoxidized compact and gaseous product which vaporizes away, said free carbon being in an amount which produces a deoxidized compact having an oxygen content ranging from greater than about 0.35% by weight to about 1.1% by weight of said deoxidized compact and which is at least about 20% by weight lower than said predetermined oxygen content, and sintering said deoxidized compact at ambient pressure in a nonoxidizing atmosphere selected from the group consisting of argon, nitrogen and mixtures thereof at a temperature ranging from about 1900° C. to about 2200° C. producing said sintered body, said compact retaining the oxygen content during said sintering in an amount greater than about 0.35% by weight of said compact, said oxygen content being determinable by neutron activation analysis.

3. A polycrystalline aluminum nitride body having a density greater than 85% of the theoretical density for aluminum nitride and a thermal conductivity greater than 0.5 W/cm·K at 22° C., said body consisting essentially of aluminum nitride phase, said body containing oxygen ranging from greater than about 0.40% by weight up to about 0.9% by weight of said body as determined by neutron analysis, said body containing carbon in an amount ranging from a detectable amount to less than about 0.2% by weight of said body, said body being produced by the process which consists essentially of providing at least a substantially uniform particulate mixture comprised of aluminum nitride having a predetermined oxygen content greater than about 0.8% by weight of said particulate aluminum nitride and a carbonaceous additive selected from the group consisting of free carbon, carbonaceous organic material and mixtures thereof, said aluminum nitride having a specific surface area greater than about 4.7 m$^2$/g, said carbonaceous organic material pyrolyzing at a temperature ranging from about 50° C. to 1000° C. to free carbon and gaseous product of decomposition which vaporizes away, said free carbon having a specific surface area greater than about 40 m$^2$/g, deoxidizing said particulate mixture by heating said mixture in a nonoxidizing atmosphere selected from the consisting of argon, nitrogen and mixtures thereof to a temperature ranging from about 1350° C. to about 1750° C. pyrolyzing any organic material therein to produce free carbon and reacting the free carbon therein with the oxygen content of said aluminum nitride producing deoxidized powder and gaseous product which vaporizes away, said free carbon being in an amount which produces a deoxidized powder having an oxygen content ranging from greater than about 0.8% by weight to about 1.1% by weight of said deoxidized powder and which is at least about 20% by weight lower than said predetermined oxygen content, shaping the deoxidized powder into a compact and sintering the compact at ambient pressure in a nonoxidizing atmosphere selected from the group consisting of argon, nitrogen and mixtures thereof at a temperature ranging from about 1900° C. to about 2200° C. producing said sintered body, said compact retaining its oxygen content in an amount greater than about 0.4% by weight of said compact during said sintering, said oxygen content being determinable by neutron activation analysis.

4. A polycrystalline aluminum nitride body having a density greater than 85% of the theoretical density for aluminum nitride and a thermal conductivity greater than 0.5 W/cm·K at 22° C., said body consisting essentially of aluminum nitride phase, said body containing oxygen ranging from greater than about 0.40% by weight up to about 0.9% by weight of said body as determined by neutron activation analysis, said body containing carbon in an amount ranging from a detectable amount to less than about 0.2% by weight of said body, said body being produced by the process which consists essentially of providing at least a substantially uniform particulate mixture comprised of aluminum nitride having a predetermined oxygen content greater than about 0.8% by weight of said particulate aluminum nitride and a carbonaceous additive selected from the group consisting of free carbon, a carbonaceous organic material and mixtures thereof, said aluminum nitride having a specific surface area greater than about 4.7 $m^2/g$, said carbonaceous organic material pyrolyzing at a temperature ranging from about 50° C. to 1000° C. to free carbon and gaseous product of decomposition which vaporizes away, said free carbon having a specific surface area greater than about 40 $m^2/g$, shaping said mixture into a compact, deoxidizing said compact by heating said compact in a nonoxidizing atmosphere selected from the group consisting of argon, nitrogen and mixtures thereof to a temperature ranging from about 1350° C. up to a temperature at which the pores of the compact remain open pyrolyzing any organic material therein to produce free carbon and reacting the free carbon therein with the oxygen content of said aluminum nitride producing said deoxidized compact and gaseous product which vaporizes away, said free carbon being in an amount which produces a deoxidized compact having an oxygen content ranging from greater than about 0.50% by weight up to about 0.9% by weight of said deoxidized compact and which is at least about 20% by weight lower than said predetermined oxygen content, and sintering said deoxidized compact at ambient pressure in a nonoxidizing atmosphere selected from the group consisting of argon, nitrogen and mixtures thereof at a temperature ranging from about 1900° C. to about 2200° C. producing said sintered body, said compact retaining the oxygen content during said sintering in an amount greater than about 0.4% by weight of said compact, said oxygen content being determinable by neutron activation analysis.

5. The polycrystalline aluminum nitride body according to claim 1 wherein said atmosphere is nitrogen.

6. The polycrystalline aluminum nitride body according to claim 1 wherein said density is greater than 90% of the theoretical density for aluminum nitride.

7. The polycrystalline aluminum nitride body according to claim 1 wherein said density is greater than 95% of the theoretical density for aluminum nitride.

8. The polycrystalline aluminum nitride body according to claim 2 wherein said atmosphere is nitrogen.

9. The polycrystalline aluminum nitride body according to claim 2 wherein said density is greater than 90% of the theoretical density for aluminum nitride.

10. The polycrystalline aluminum nitride body according to claim 2 wherein said density is greater than 95% of the theoretical density for aluminum nitride.

11. The polycrystalline aluminum nitride body according to claim 3 wherein said atmosphere is nitrogen.

12. The polycrystalline aluminum nitride body according to claim 3 wherein said density is greater than 90% of the theoretical density for aluminum nitride.

13. The polycrystalline aluminum nitride body according to claim 3 wherein said density is greater than 95% of the theoretical density for aluminum nitride.

14. The polycrystalline aluminum nitride body according to claim 4 wherein said atmosphere is nitrogen.

15. The polycrystalline aluminum nitride body according to claim 4 wherein said density is greater than 90% of the theoretical density for aluminum nitride.

16. The polycrystalline aluminum nitride body according to claim 4 wherein said density is greater than 95% of the theoretical density for aluminum nitride.

* * * * *